United States Patent
Symonds et al.

(10) Patent No.: US 11,312,310 B2
(45) Date of Patent: Apr. 26, 2022

(54) OUTER TRUCK BED SIDE PANEL WORK BENCH

(71) Applicants: Phillip Lynn Symonds, Adams, MA (US); Joseph Edward Fox, Plainfield, MA (US)

(72) Inventors: Phillip Lynn Symonds, Adams, MA (US); Joseph Edward Fox, Plainfield, MA (US)

(*) Notice: Subject to any disclaimer, the term of this patent is extended or adjusted under 35 U.S.C. 154(b) by 358 days.

(21) Appl. No.: 16/698,124

(22) Filed: Nov. 27, 2019

(65) Prior Publication Data
US 2021/0155164 A1    May 27, 2021

(51) Int. Cl.
*B60R 9/02* (2006.01)
*B62D 33/023* (2006.01)
*B60R 11/06* (2006.01)

(52) U.S. Cl.
CPC .............. *B60R 9/02* (2013.01); *B62D 33/023* (2013.01); *B60R 11/06* (2013.01)

(58) Field of Classification Search
CPC ....... B60R 2011/004; B60R 2011/0082; B60R 9/02; B62D 33/023; B62D 33/027
USPC ....................................... 296/37.6
See application file for complete search history.

(56) References Cited

U.S. PATENT DOCUMENTS

| | | | |
|---|---|---|---|
| 2,365,940 A | 12/1944 | Couse et al. | |
| 4,135,761 A | 1/1979 | Ward | |
| 4,917,430 A | 4/1990 | Lawrence | |
| 5,215,346 A | 6/1993 | Reitzloff et al. | |
| 5,518,158 A | 5/1996 | Matlack | |
| 5,615,922 A | 4/1997 | Blanchard | |
| 5,823,595 A | 10/1998 | Tronco | |
| 5,979,617 A * | 11/1999 | Clare | B60J 10/00 188/322.12 |
| 6,059,341 A | 5/2000 | Jensen et al. | |
| 6,059,343 A | 5/2000 | Emery | |
| 6,105,231 A | 8/2000 | Clare et al. | |
| 6,116,676 A | 9/2000 | Edwards | |
| 6,439,634 B1 * | 8/2002 | Jensen | E05B 83/16 224/402 |
| 6,447,039 B1 | 9/2002 | Song | |
| 6,485,077 B1 * | 11/2002 | Foster | B60R 11/06 296/183.1 |
| 6,588,822 B1 | 7/2003 | Duvall, Jr. | |
| 7,461,884 B2 | 12/2008 | Clare et al. | |
| 7,571,947 B2 | 8/2009 | Hawley | |
| 7,950,728 B2 * | 5/2011 | Plavetich | B60R 9/00 296/193.01 |
| 9,511,803 B2 * | 12/2016 | Wassell | B62D 33/03 |
| 10,328,860 B2 * | 6/2019 | Lewis | B60J 5/10 |
| 10,974,653 B2 * | 4/2021 | Scaringe | B60J 5/0491 |

(Continued)

*Primary Examiner* — Jason S Morrow
(74) *Attorney, Agent, or Firm* — Dunlap Bennett & Ludwig, PLLC

(57) ABSTRACT

A vehicle workbench assembly for the exterior side of a truck bed is provided. The vehicle workbench assembly includes an integral workbench pivotably connected to the exterior side of the truck bed so as to move between a latched position nested in a sidewall cavity of the exterior side of the truck bed and an operable position perpendicularly extending therefrom. The integral workbench provides a wheel gap for accommodating the trucks wheel or wheel well in the latched position. A wheel gap plate is provided to fill the void of the wheel gap in the operable position.

2 Claims, 4 Drawing Sheets

(56) References Cited

U.S. PATENT DOCUMENTS

| | | |
|---|---|---|
| 2001/0050491 A1 | 12/2001 | Clare et al. |
| 2002/0109369 A1 | 8/2002 | Boomhower et al. |
| 2005/0052045 A1 | 3/2005 | Juzwiak |
| 2005/0093339 A1* | 5/2005 | Klassen ................. B62D 33/03 296/183.1 |
| 2005/0225117 A1* | 10/2005 | Miskech ................... B60P 3/40 296/183.1 |
| 2010/0206666 A1* | 8/2010 | Jeeves ....................... B60P 3/14 182/150 |

\* cited by examiner

OUTER TRUCK BED SIDE PANEL WORK BENCH

BACKGROUND OF THE INVENTION

The present invention relates to work accessories for vehicles, such as pickup trucks and, more particularly, to an outer truck bed side panel work bench. Small trucks, such as pickup trucks, are commonly used by various trades, such as plumbing, electrical, construction, repair, and the like, for transporting and/or storing tools. Frequently, though, for those plying these trades, when they arrive at a job site, there is no workbench for using their tools. The beds of these pickup trucks are already full with said tools, equipment, parts, and material making adding a workbench to the payload too much.

As can be seen, there is a need for an outer side work bench incorporated into the exterior side(s) of the truck bed, which is currently not a standard feature of pickup trucks.

SUMMARY OF THE INVENTION

In one aspect of the present invention, a workbench assembly for a vehicle includes the following: a vehicle having a side panel adjacent to a wheel of the vehicle; an integral workbench pivotably connected to the side panel so as to move between a latched position and an operable position transversely extending from the side panel; a panel cavity defined by the side panel set inward from an exterior surface of a vehicle sidewall, wherein the integral workbench nests in the panel cavity in the latched position; and a wheel gap void of the integral workbench for accommodating the wheel in the latched position.

In another aspect of the present invention, the workbench assembly for a vehicle further includes the following: a gap flange set off from the inner surface, toward an outward-facing surface of the integral workbench; the gap flange extends inward from a periphery of the wheel gap; and a wheel gap plate dimensioned to be substantially coextensive with the wheel gap so as to be supported by the gap flange in the operable position, wherein in certain embodiments, one or more lighting devices disposed in the panel cavity.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a vehicle workbench assembly for the exterior side of a truck bed. The vehicle workbench assembly includes an integral workbench pivotably connected to the exterior side of the truck bed so as to move between a latched position nested in a sidewall cavity of the exterior side of the truck bed and an operable position perpendicularly extending therefrom. The integral workbench provides a wheel gap for accommodating the trucks wheel or wheel well in the latched position. A wheel gap plate is provided to fill the void of the wheel gap in the operable position.

Figure 1:
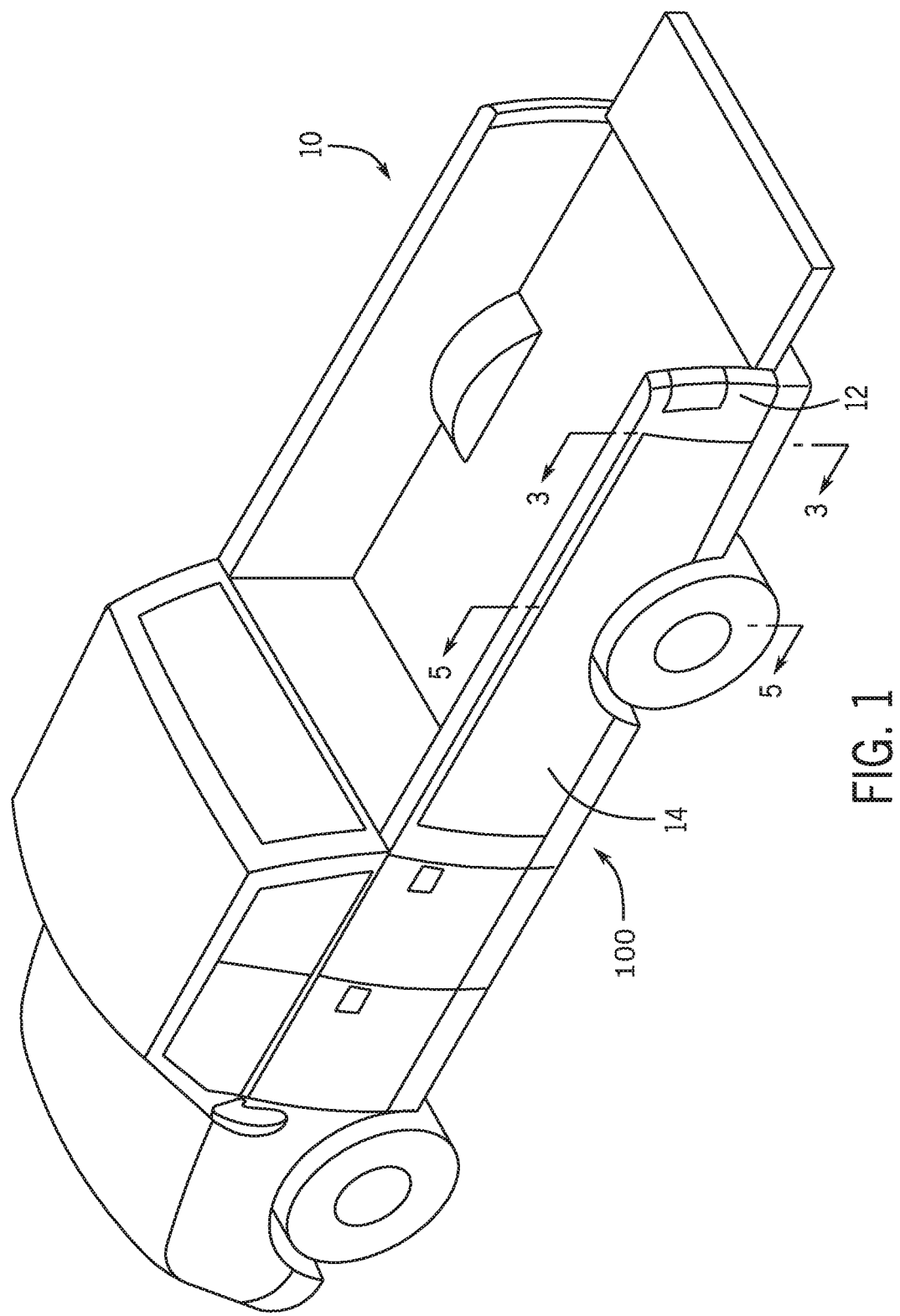
FIG. 1 is a perspective view of an exemplary embodiment of the present invention in a stored mode.
Figure 2:
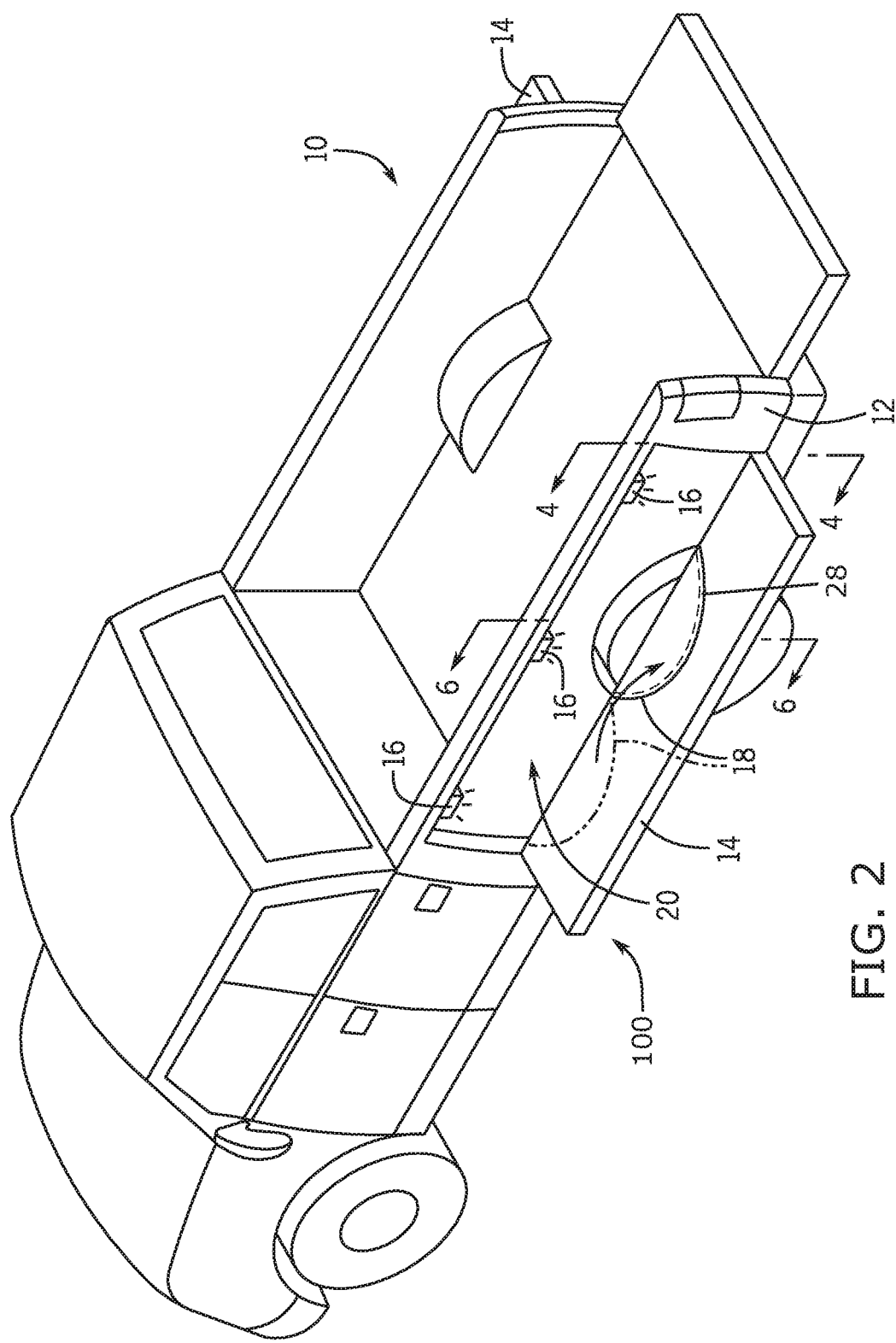
FIG. 2 is a perspective view of an exemplary embodiment of the present invention, shown in use.
Figure 4:
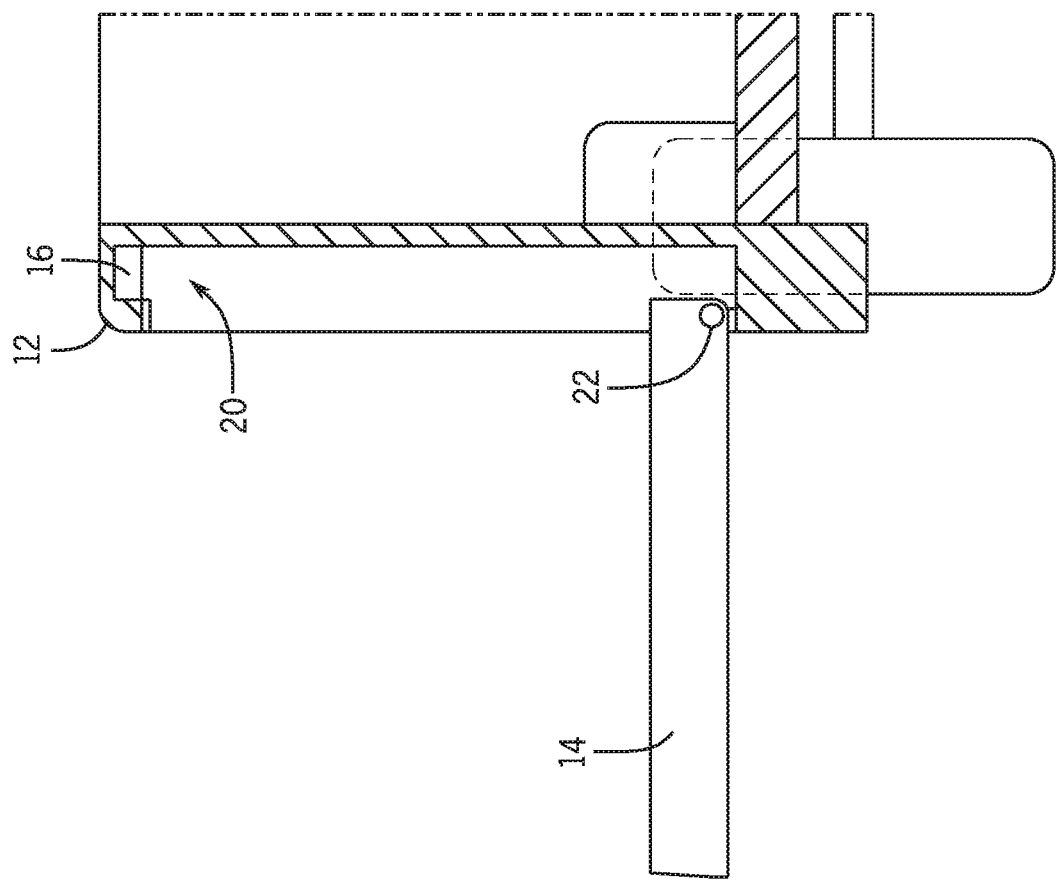
FIG. 4 is a cross-section view of an exemplary embodiment of the present invention, taken along line 4-4 of FIG. 2.
Figure 6:
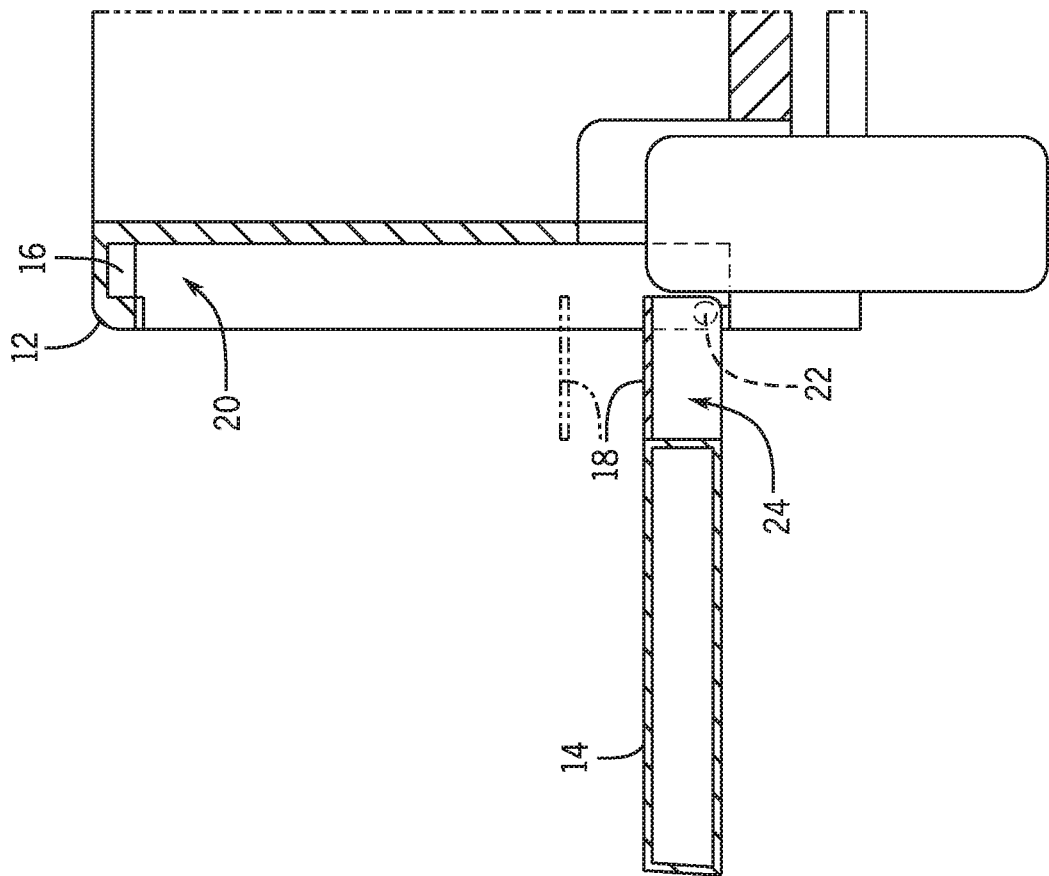
FIG. 6 is a cross-section view of an exemplary embodiment of the present invention, taken along line 6-6 of FIG. 2.

Referring to FIGS. 1 through 6, the present invention may include a vehicle workbench assembly 100. The vehicle workbench assembly 100 may include an integral workbench 14 pivotably connected to an outer surface along a side portion 12 of a vehicle 10, by way of a pivot attachment 22, so as to be movable between a latched position (FIGS. 1, 3 and 5) and an operable position (FIGS. 2, 4 and 6). The operable position is generally perpendicular with the side portion 12 and generally parallel with a supporting surface of the vehicle 10. In the latched position, the integral workbench 14 can be locked to the vehicle 10.

Figure 3:
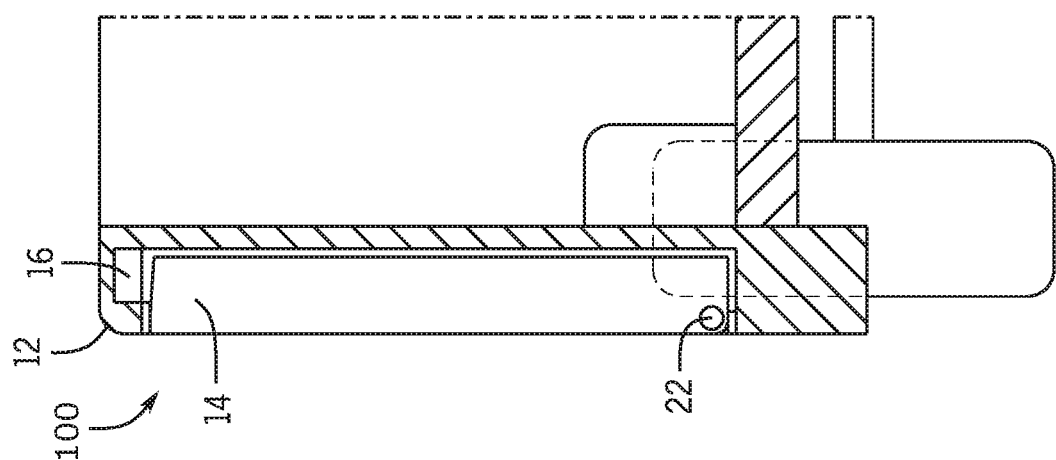
FIG. 3 is a cross-section view of an exemplary embodiment of the present invention, taken along line 3-3 of FIG. 1.
Figure 5:
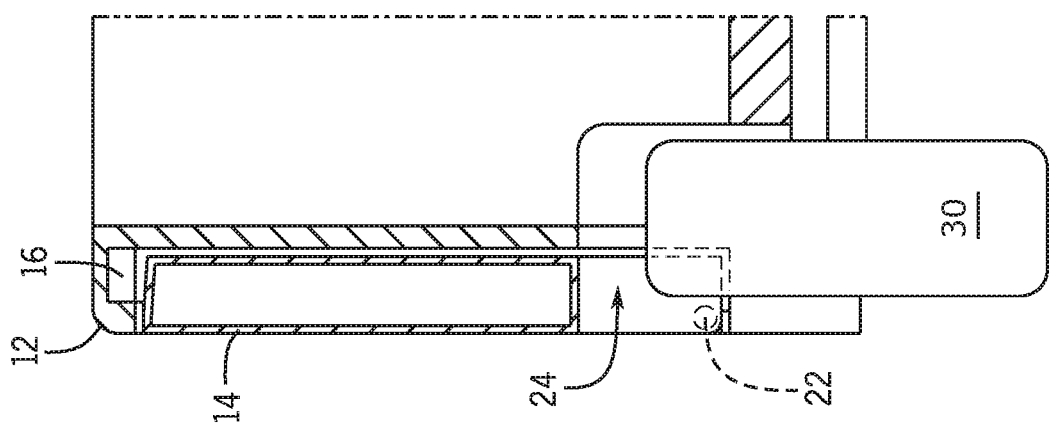
FIG. 5 is a cross-section view of an exemplary embodiment of the present invention, taken along line 5-5 of FIG. 1.

The side portion 12 may be a sidewall of a pickup truck, wherein a panel cavity 20 is provided for the integral workbench 14 to nest in the latched position, as illustrated in FIGS. 3 and 5. One or more lighting devices 16, such as LEDs, may be provided in the panel cavity 20. The lighting devices 16 may be adapted to automatically be powered when the integral workbench 14 is in the operable position.

The integral workbench 14 is dimensioned and adapted so that an exterior surface thereof, the exterior surface being outward-facing in the latched position, is generally flush and contiguous with the remaining portions of the associated sidewalls of the vehicle 10. The integral workbench 14 may bed further dimensioned and adapted to have a wheel gap 24, a cutout or void, to accommodate the wheel 30 in the latched position, as illustrated in FIG. 5.

The wheel gap 24 provides a gap flange 28, indicated by the dashed line in FIG. 2, which is set off from the inner surface (toward the exterior surface). The gap flange 28 extends inward along the periphery of the wheel gap 24. A wheel gap plate 18 is dimensioned to be substantially coextensive with the wheel gap 24 so as to be supported by the gap flange 28 under the force of gravity in the operable position. An inner surface of the wheel gap plate 18 may be generally co-planar with the interior surface of the interior workbench 14 when the wheel gap plate 18 supported by the gap flange 28—i.e. a flush condition.

In the operable position, the integral workbench 14 forms a work bench on the side of the vehicle 10, in certain embodiments, a pickup truck bed. The inner wall of the bed side panels stays in place, thus maintaining the integrity of the bed while the integral workbench 14 is in the operable position.

A method of using the present invention may include the following. The vehicle workbench assembly 100 disclosed above may be provided. After arriving at the worksite, a user may unlock the integral workbench 14 in the latched position and then move it to the operable position. Then the user may move the wheel gap plate 18 to the flush condition in the wheel gap 24. The user can now use the workbench for plying their tools, supporting equipment, reading blueprints, etc. The vehicle workbench assembly 100 may be disposed on one or both sides of the exterior of a bed of a pickup truck.

It should be understood, of course, that the foregoing relates to exemplary embodiments of the invention and that modifications may be made without departing from the spirit and scope of the invention as set forth in the following claims.

What is claimed is:

1. A workbench assembly for a vehicle, comprising:
   a vehicle having a side panel adjacent to a wheel of the vehicle;
   an integral workbench pivotably connected to the side panel so as to move between a latched position and an operable position transversely extending from the side panel;
   a panel cavity defined by the side panel set inward from an exterior surface of a vehicle sidewall, wherein the integral workbench nests in the panel cavity in the latched position;
   a wheel gap void of the integral workbench for accommodating the wheel in the latched position;
   a gap flange set off from the inner surface, toward an outward-facing surface of the integral workbench;
   the gap flange extends inward from a periphery of the wheel gap; and
   a wheel gap plate dimensioned to be substantially coextensive with the wheel gap so as to be supported by the gap flange in the operable position.

2. The workbench assembly for a vehicle of claim 1, further comprising:
   one or more lighting devices disposed in the panel cavity.

\* \* \* \* \*